US011003301B2

United States Patent
Hosotsubo

(10) Patent No.: US 11,003,301 B2
(45) Date of Patent: May 11, 2021

(54) CONTROL PANEL OF MACHINE

(71) Applicant: Sodick Co., Ltd., Kanagawa (JP)

(72) Inventor: Yoshitaka Hosotsubo, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 16/159,732

(22) Filed: Oct. 15, 2018

(65) Prior Publication Data

US 2019/0114008 A1 Apr. 18, 2019

(30) Foreign Application Priority Data

Oct. 16, 2017 (JP) .............................. JP2017-200230

(51) Int. Cl.
*G06F 3/041* (2006.01)
*G06F 3/048* (2013.01)
*G06F 3/045* (2006.01)
G06F 3/0488 (2013.01)

(52) U.S. Cl.
CPC ............ *G06F 3/045* (2013.01); *G06F 3/0416* (2013.01); *G06F 3/04886* (2013.01); *G06F 2203/04104* (2013.01); *G06F 2203/04808* (2013.01)

(58) Field of Classification Search
CPC . G06F 3/0416–045; G06F 2203/04104–04808
See application file for complete search history.

(56) References Cited

U.S. PATENT DOCUMENTS

2008/0309640 A1* 12/2008 Hong .................... G06F 1/1624
345/173
2009/0161060 A1* 6/2009 Li .......................... G06F 3/045
349/155

(Continued)

FOREIGN PATENT DOCUMENTS

JP H06149463 5/1994
JP 2003043450 2/2003

(Continued)

OTHER PUBLICATIONS

"Office Action of Japan Counterpart Application," dated May 15, 2019, with English translation thereof, p. 1-p. 10.

(Continued)

*Primary Examiner* — Lin Li
(74) *Attorney, Agent, or Firm* — JCIPRNET

(57) ABSTRACT

A control panel including a multi-touch panel in resistive film type having a touch surface receiving a touch operation and a plurality of cells formed by dividing the touch surface, and a controller is provided. The multi-touch panel outputs a first output signal indicating one position in one cell when a touch operation is performed at a single position in the one cell or the touch operation is simultaneously performed at a plurality of positions in the one cell, and outputs a second output signal separately indicating each of a plurality of positions in at least two different cells when the touch operation is simultaneously performed in at least two different cells. The controller outputs a control signal indicating coordinates of the one position when receiving the first output signal, and does not output a control signal indicating coordinates of the plurality of positions when receiving the second output signal.

4 Claims, 5 Drawing Sheets

(56) References Cited

U.S. PATENT DOCUMENTS

| | | | |
|---|---|---|---|
| 2009/0189877 A1* | 7/2009 | Washino | G06F 3/04883 345/174 |
| 2009/0314551 A1* | 12/2009 | Nakajima | G06F 3/045 178/18.05 |
| 2009/0322701 A1* | 12/2009 | D'Souza | G06F 3/045 345/174 |
| 2010/0182278 A1* | 7/2010 | Li | G06F 3/04166 345/174 |
| 2011/0069040 A1* | 3/2011 | Ito | G06F 3/04186 345/178 |
| 2012/0268419 A1* | 10/2012 | Matsuda | G06F 3/045 345/174 |
| 2014/0028591 A1 | 1/2014 | Kanda et al. | |
| 2014/0293162 A1* | 10/2014 | Park | G02F 1/133502 349/12 |
| 2017/0205935 A1 | 7/2017 | Katayama et al. | |
| 2018/0284930 A1* | 10/2018 | Ban | G06F 3/0412 |

FOREIGN PATENT DOCUMENTS

| | | |
|---|---|---|
| JP | 2003280812 | 10/2003 |
| JP | 4422527 | 2/2010 |
| JP | 2013025621 | 2/2013 |
| JP | 2014026365 | 2/2014 |
| JP | 2016018297 | 2/2016 |
| JP | 2017126299 | 7/2017 |

OTHER PUBLICATIONS

"Office Action of Japan Counterpart Application," with English translation thereof, dated Oct. 24, 2018, p. 1-p. 9.

* cited by examiner

CONTROL PANEL OF MACHINE

CROSS-REFERENCE TO RELATED APPLICATION

This application claims the priority of Japan patent application serial no. 2017-200230, filed on Oct. 16, 2017. The entirety of the above-mentioned patent application is hereby incorporated by reference herein and made a part of this specification.

BACKGROUND

Technical Field

The disclosure relates to a control panel of a machine, and more particularly to a control panel of a machine using a touch panel.

Description of Related Art

A control panel in which an input can be performed by a touch operation using a touch panel in a control panel of industrial machine, machine tool, and so on is known. In the touch panel, various methods are known according to each operating principle.

An electrostatic capacitive touch panel senses a change in electrostatic capacitance by a sensor. The change in electrostatic capacitance is caused when a finger touches a screen. Thus the electrostatic capacitive touch panel grasps a touch position. In particular, a projection-type electrostatic capacitance touch panel is characterized by ease of multi-point detection, i.e., multi-touch. On the other hand, the electrostatic capacitive touch panels are unsuitable for control panels of machines which require high safety because they sense unintended contact as an input.

In a resistive film type touch panel, a position on a screen pressed with a predetermined pressure is detected by measuring a change in voltage. The typical resistive film type touch panel is a so-called single touch panel and does not support two or more touch operations at the same time. In a control panel equipped with the resistive film type single touch panel, when two or more touch operations are performed at the same time, a midpoint of pressed points is recognized as input coordinates. Accordingly, when two or more touch operations are performed unexpectedly, an unintended input may be made. Therefore, a resistive film type multi-touch panel which can perform a multi-point input has been proposed (Patent Document 1).

Patent Documents

[Patent Document 1] Japanese Unexamined Patent Publication No. H06-149463

In the control panels of the machines, high safety is generally required. Specifically, in the control panel equipped with a touch panel, it is desirable not to recognize the unintended contact as an input and to disable the multi-touch.

SUMMARY

The disclosure provides a control panel of a machine using a touch panel having higher safety.

According to the disclosure, there is provided a control panel of a machine including: a multi-touch panel in resistive film type which has a touch surface that receives a touch operation, and a plurality of cells formed by dividing the touch surface into a plurality of parts in an X direction and a Y direction orthogonal to the X direction, and the multi-touch panel which outputs a first output signal indicating one position in one cell when the touch operation is performed at a single position in the one cell or the touch operation is simultaneously performed at a plurality of positions in the one cell, and outputs a second output signal separately indicating each of a plurality of positions in at least two different cells when the touch operation is simultaneously performed in at least two different cells; and a controller which outputs a control signal indicating coordinates of the one position when receiving the first output signal and does not output a control signal indicating the coordinates of the plurality of positions when receiving the second output signal.

In the control panel of the machine according to the disclosure, multi-touch is recognized by a multi-touch panel in resistive film type, and the multi-touch is disabled by a controller when the multi-touch is recognized. Therefore, it is possible to realize a control panel of a machine having higher safety which can minimize an unintended input.

DESCRIPTION OF THE EMBODIMENTS

Figure 1:
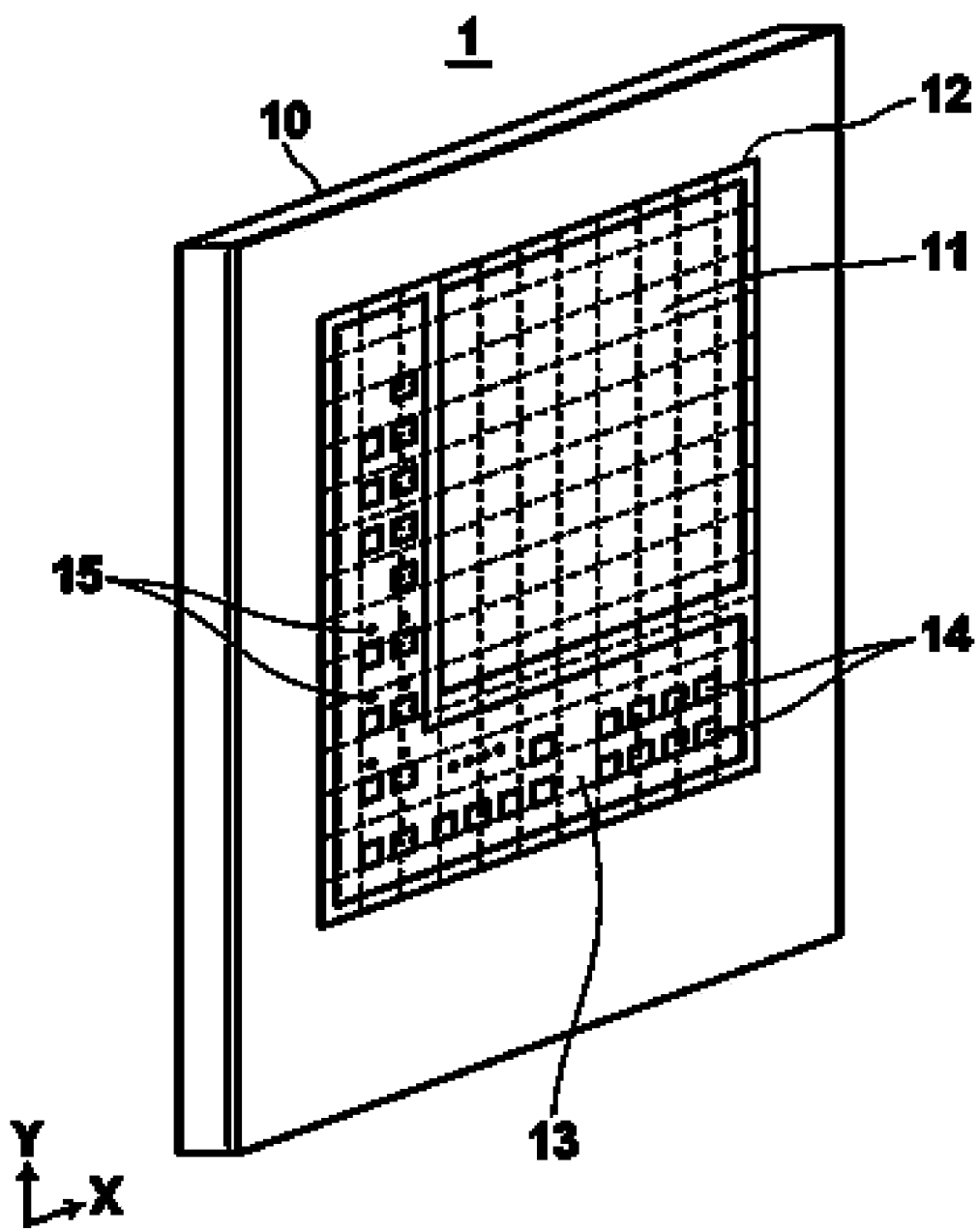
FIG. 1 is a schematic perspective view showing a control panel of a machine according to a first embodiment of the disclosure.
Figure 2:
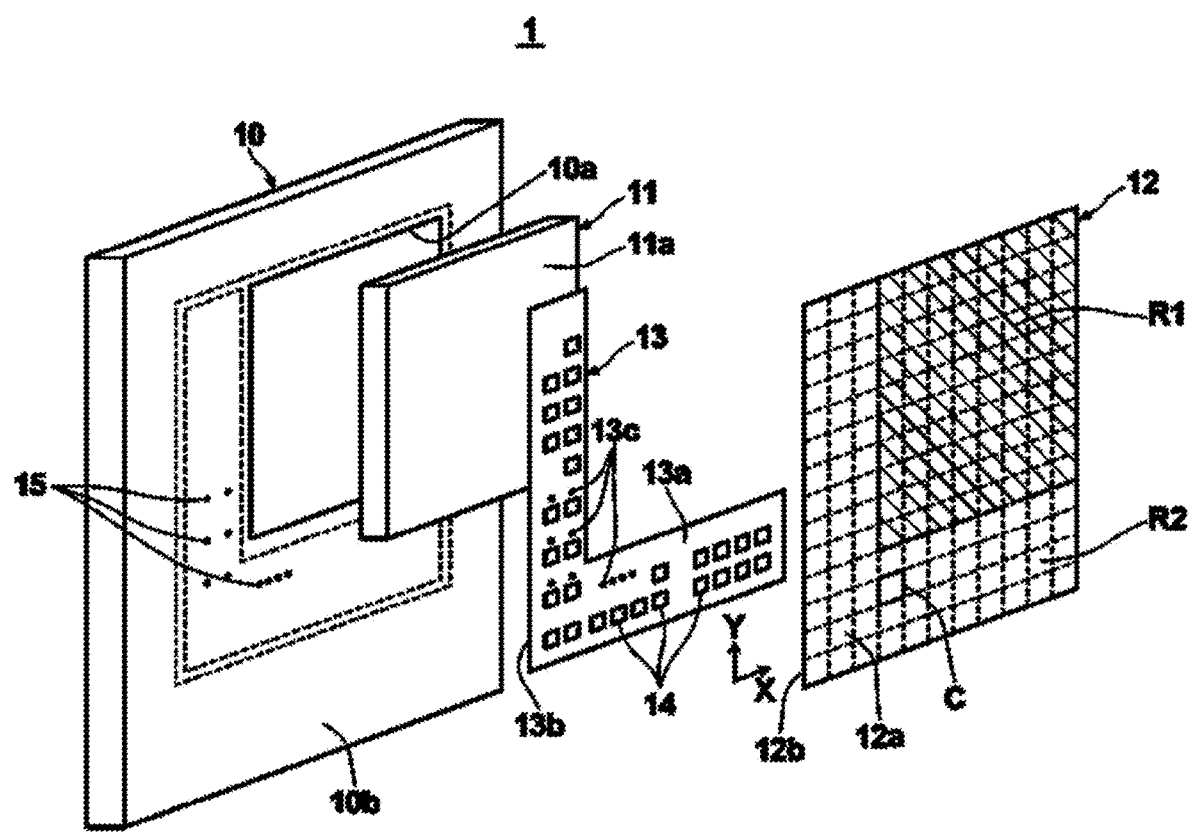
FIG. 2 is an exploded perspective view showing the control panel of the machine shown in FIG. 1 in an exploded state.

Hereinafter, an embodiment of the disclosure will be described with reference to the drawings. FIG. 1 shows a schematic overall shape of a control panel 1 of a machine according to a first embodiment of the disclosure. FIG. 2 shows an exploded view of the control panel 1. As shown in FIG. 1 and FIG. 2, the control panel 1 includes a casing 10, an image display panel 11, a multi-touch panel 12, and a key sheet 13. The image display panel 11 is, for example, a liquid crystal display panel and is held in the casing 10. The multi-touch panel 12 is a resistive film type touch panel which can perform a multi-point input. A part of the multi-touch panel 12 covers a display surface 11a of the image display panel 11. The key sheet 13 is disposed between the multi-touch panel 12 and the casing 10.

The casing 10 serves as a support which supports the image display panel 11, the multi-touch panel 12, and the key sheet 13. That is, the image display panel 11 is accommodated and fixed in an opening 10a provided in a part of the casing 10. The key sheet 13 is fixed on a front surface 10b of the casing 10 at an area deviated from the opening 10a. Additionally, the multi-touch panel 12 is supported by the casing 10, and has a first region R1 and a second region R2. The first region R1 faces substantially an entire surface of the display surface 11a of the image display panel 11. The second region R2 is a region other than the first region R1, that is, a region located at an area deviated from an area facing a display surface 11a. The second region R2 faces substantially an entire surface of a front surface 13a of the key sheet 13. In other words, the multi-touch panel 12 has the first region R1 corresponding to the image display panel 11 and the second region R2 corresponding to the key sheet 13.

The image display panel 11 is connected to a drive circuit (not shown) and displays a first operation key 11B formed on a basis of a predetermined image signal, a set state or numerical value, an operation state of the machine, and the like on the display surface 11a. In particular, set conditions are displayed on a condition display field 11C.

Figure 3:
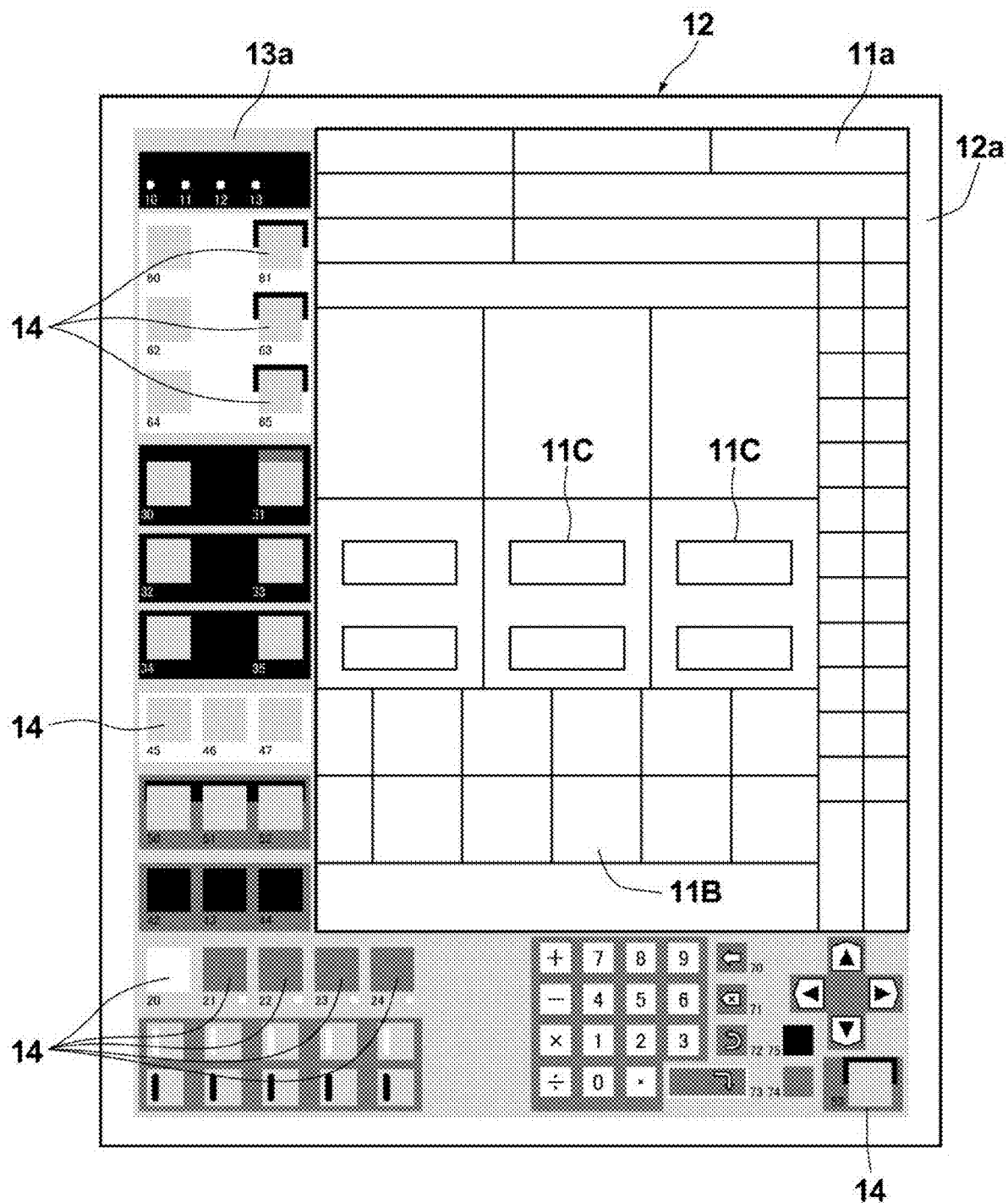
FIG. 3 is a front view showing a display portion of the control panel of the machine shown in FIG. 1.

In the key sheet 13, a plurality of second operation keys 14 are printed on the front surface 13a. Although a shape of the key sheet 13 is not limited to a specific shape, the shape of the key sheet 13 is substantially an L-shape in the first embodiment. Additionally, the key sheet 13 is fixed to the casing 10 in a state that two rectangular portions which form the L-shape of the key sheet 13 are respectively located outside two adjacent sides of the image display panel 11. This fixation is performed, for example, by adhering a rear surface 13b of the key sheet 13 to the front surface 10b of the casing 10. The key sheet 13 fixed to the casing 10 is brought into contact with a rear surface 12b which is a surface of the multi-touch panel 12 opposite to a touch surface 12a receiving a touch operation. In addition, a name, icon, or other symbols may be contained in the key sheet 13 for the respective second operation keys 14. In the key sheet 13 of the first embodiment, as shown in FIG. 3, operation key numbers are described corresponding to the respective second operation keys 14. An operator can operate while referring to the operation key numbers and a list of operations corresponding to the operation key numbers.

That is, the control panel 1 according to the first embodiment has two systems of input interfaces in external appearance, namely, the first region R1 corresponding to the image display panel 11 and the second region R2 corresponding to the key sheet 13. In the first region R1, the operator can input while referring to a variety of information displayed on the display surface 11a of the image display panel 11. It is possible to switch types of the first operation keys 11B by switching a screen of the display surface 11a and to cope with various operation instructions. Therefore, the first operation keys 11B of the image display panel 11 mainly include keys to perform operation instructions for inputting operation settings and condition settings of the machine, selecting input fields or buttons, switching a display of the image display panel 11, displaying an operation state of the machine, and so on. On the other hand, in the second region R2, the second operation keys 14 and the operation instructions normally correspond to each other in a one-to-one correspondence. Therefore, the second operation keys 14 of the key sheet 13 mainly include keys to perform operation instructions about actual operations of the machine, which are desired to be reliably operated for safety. In this way, the first operation keys 11B and the second operation keys 14 are disposed in the input interfaces of two systems in the external appearance according to the contents of each operation instruction. Actually, the input to the first operation keys 11B of the image display panel 11 and the input to the second operation keys 14 of the key sheet 13 are both performed by the multi-touch panel 12. It is not necessary to provide a physical button in the key sheet 13. Therefore, the casing 10 can be formed thinner, and the control panel 1 can be manufactured at a low cost. Further, changes in layouts of the second operation keys 14 or the operations corresponding to the second operation keys 14 can be easily performed by changing settings on software and replacing the key sheet 13. The first operation keys 11B and the second operation keys 14 are predetermined sections which receive the touch operations, and sizes and shapes of the first operation keys 11B and the second operation keys 14 are not particularly limited.

A plurality of LEDs 15 are mounted on the front surface 10b of the casing 10. Light emitted from these LEDs 15 passes through holes 13c provided in the key sheet 13 and can be viewed from the front surface 13a side of the key sheet 13. This light is used to illuminate, for example, the second operation keys 14 formed in key sheet 13 or any description formed in the key sheet 13 in correspondence with the respective second operation keys 14. Alternatively, the light may be viewed in or near a predetermined second operation key 14, and it may be possible to blink the light while the operation of the machine designated by the predetermined second operation key 14 is proceeding, thereby allowing the operator to know that the operation is proceeding.

Figure 4:
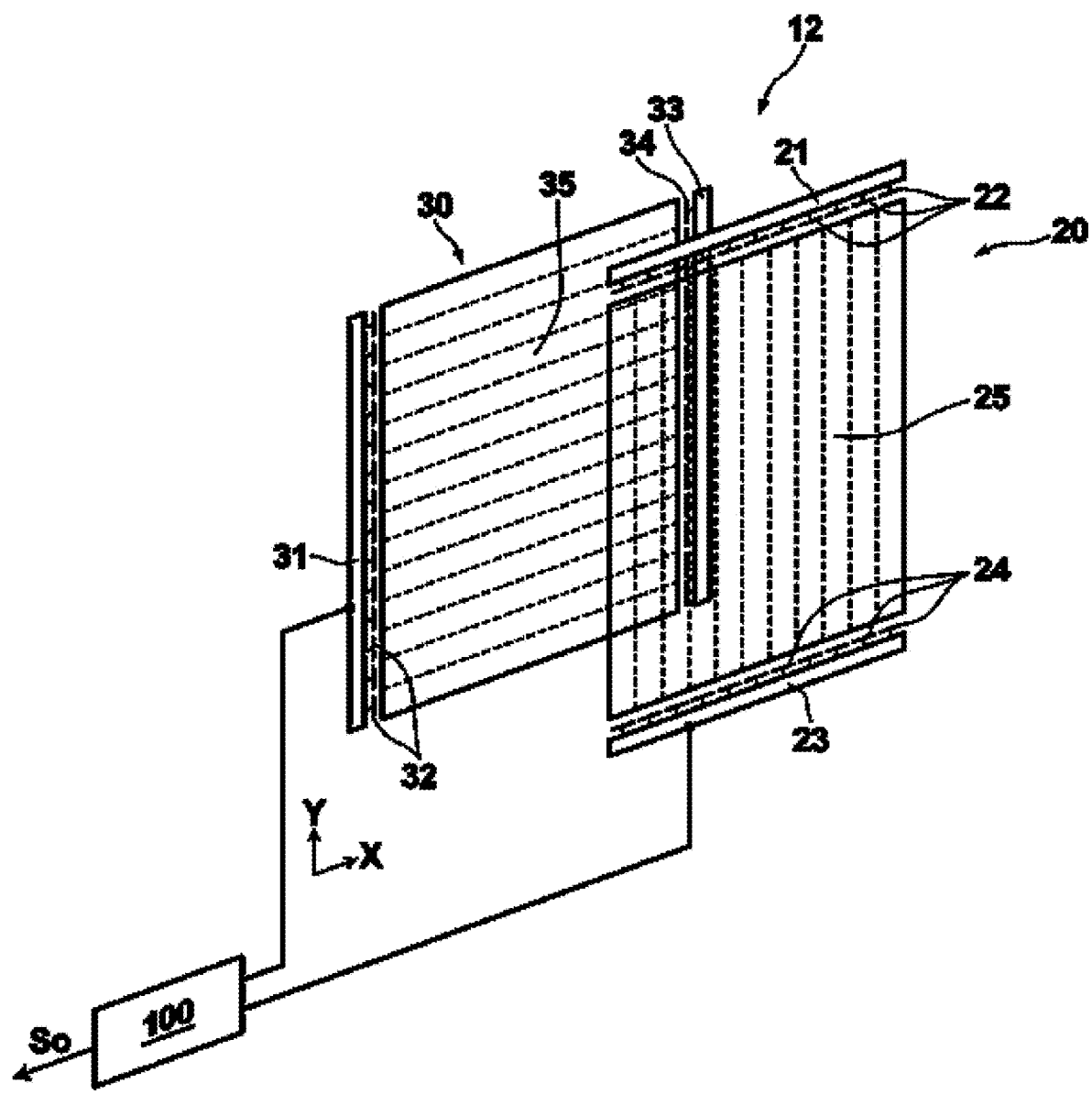
FIG. 4 is an exploded perspective view showing a multi-touch panel of the control panel of the machine shown in FIG. 1 in an exploded state.

As shown in the exploded perspective view of FIG. 4, the multi-touch panel 12 includes a first panel 20 and a second panel 30 which are disposed to face each other. The first panel 20 includes a first electrode substrate 21, a plurality of first divided electrodes 22 connected to the first electrode substrate 21 and disposed parallel to each other in an X direction, a second electrode substrate 23 disposed to face the first electrode substrate 21 with a predetermined gap therebetween, a plurality of second divided electrodes 24 connected to the second electrode substrate 23 and disposed in parallel with each other in the X direction, and a first conductive film 25 disposed between the first divided electrodes 22 and the second divided electrodes 24. The first conductive film 25 is, for example, a film formed of a light-transmitting conductive material such as an indium tin oxide. The first conductive film 25 has a plurality of first strip-shaped transparent conductive films disposed in parallel between the first divided electrode 22 and the second divided electrode 24 facing each other. In other words, in the first conductive film 25, the plurality of first strip-shaped conductive films which extend in a Y direction between one first divided electrode 22 and one second divided electrode 24 facing each other are disposed in parallel while separated from each other in the X direction. A voltage is applied from the first divided electrode 22 and the second divided electrode 24 to each of the first strip-shaped conductive films.

On the other hand, the second panel 30 includes a third electrode substrate 31, a plurality of third divided electrodes 32 connected to the third electrode substrate 31 and disposed in parallel with each other in the Y direction, a fourth electrode substrate 33 disposed to face the third electrode substrate 31 with a predetermined gap therebetween, a plurality of fourth divided electrodes 34 connected to the fourth electrode substrate 33 and disposed in parallel with each other in the Y direction, and a second conductive film 35 disposed between the third divided electrodes 32 and the fourth divided electrodes 34. The second conductive film 35 is, for example, a film formed of a light-transmitting conductive material such as an indium tin oxide. The second conductive film 35 has a plurality of second strip-shaped transparent conductive films disposed in parallel between the third divided electrode 32 and the fourth divided electrode 34 facing each other. In other words, in the second conductive film 35, the plurality of second strip-shaped conductive films which extend in the X direction between one third divided electrode 32 and one fourth divided electrode 34 facing each other are disposed in parallel while separated from each other in the Y direction. A voltage is applied from the third divided electrode 32 and the fourth divided electrode 34 to each of the second strip-shaped conductive films.

The first panel 20 and the second panel 30 are disposed, such that an arrangement direction of the first divided electrode 22 and the second divided electrode 24 and an arrangement direction of the third divided electrode 32 and the fourth divided electrode 34 are orthogonal to each other. Further, the first panel 20 and the second panel 30 are disposed, such that the first conductive film 25 and the second conductive film 35 face each other with a minute gap therebetween. A spacer formed of an insulating material is disposed between the first conductive film 25 and the second conductive film 35 to prevent a short circuit when the touch operation is not performed. In the first embodiment, the first panel 20 is provided in front of the second panel 30, but the second panel 30 may be provided in front of the first panel 20. A front surface of the multi-touch panel 12 forms the touch surface 12a which receives the touch operation.

In this way, the touch surface 12a is divided into a plurality of sections in the X and Y directions, and each of the sections is configured so that touch positions can be recognized independently during the touch operation. Hereinafter, such a section is referred to as cell C. More specifically, a region in which one first strip-shaped conductive film and one second strip-shaped conductive film face each other forms a cell C. That is, in the first embodiment, the cell C is a region defined by the first strip-shaped conductive film and the second strip-shaped conductive film.

In the multi-touch panel 12 having such a configuration, when a predetermined position on the touch surface 12a receives the touch operation, that is, a pressing operation with a predetermined pressure, the first conductive film 25 and the second conductive film 35 are brought into electrical contact with each other at the predetermined position. Accordingly, the voltage applied in the X direction and the Y direction is lowered. This change in the voltage is detected for each of the cells C and sent to a controller 100 as an output signal corresponding to coordinates in the cell C. The controller 100 can know an X direction coordinate value and a Y direction coordinate value of the touch position by processing the output signal.

The multi-touch panel 12 of the first embodiment is, so to speak, a virtually independent touch panel for each of the cells C. When a single touch operation is performed on one cell C, an output signal indicating the touch position on the cell C is output to the controller 100. When the touch operation is simultaneously performed at a plurality of positions in the cell C, an output signal indicating an approximate midpoint of the touch positions is output to the controller 100. That is, as long as the touch operation is performed on one cell C, the multi-touch panel 12 outputs a first output signal indicating one position in one cell C. On the other hand, when the touch operation is performed simultaneously on at least two different cells C, an output signal separately indicating each of a plurality of positions in each of the cells C is output to the controller 100. That is, when the touch operation is performed on a plurality of cells C, the multi-touch panel 12 outputs a second output signal indicating the plurality of positions corresponding to the number of cells C in which the touch operation has been performed.

According to such a method of detecting the touch position, not only one position touched on the touch surface 12a of the multi-touch panel 12 but also two or more positions touched simultaneously with respect to the cells C different from each other can be detected, and the signal indicating the touch position(s) can be output to the controller 100. However, an outputting method for the second output signal, that is, a specific method of separately indicating each of the plurality of positions is not particularly limited. For example, in the state of at least two positions touched simultaneously in the different cells C, signals indicating sequentially each of the touch positions in time series at a predetermined short time interval may be repeatedly output to the controller 100 as the second output signal during a period in which the simultaneously touched state is continued. For example, while the state where two positions are touched in the different cells C at the same time is continued, two signals indicating two touch positions in time series at a predetermined short time interval may be alternately repeatedly output to the controller 100 as the second output signal. The simultaneous touch operation at the plurality of positions does not mean that a start point and an end point of each of the touches are always matched, but means that the touches performed in at least two positions in the different cells C is performed in parallel at least one time. In addition, when the touch operation at at least two positions is performed continuously in a very short time interval, the continuous touch operation may be regarded as a simultaneous touch operation at a plurality of positions, and a control signal So may not be outputted. Conventionally known wiring methods such as a so-called four-wire method and a five-wire method can be adopted for the multi-touch panel 12, but a detailed wiring state is omitted in FIG. 4.

The controller 100 of the control panel of the disclosure calculates X and Y coordinates indicating one position only when the first output signal indicating one position touched on the touch surface 12a of the multi-touch panel 12 is received, and then outputs the control signal So including information on the X and Y coordinates to a control device of the machine. On the other hand, the controller 100 does not output the control signal So including the information on the X and Y coordinates of the plurality of positions even when receiving the second output signal separately indicating the plurality of portions touched on the touch surface 12a of the multi-touch panel 12.

The control device of the machine previously associates the coordinates corresponding to the first operation keys 11B and the second operation keys 14 with desired operations. Normally, a range defined by the first operation key 11B and the second operation key 14 includes a plurality of coordinate values recognizable by the multi-touch panel 12.

Next, the operation of the control panel 1 of the first embodiment will be described. The operator who operates the control panel 1 presses the first operation key 11B or the second operation key 14 and brings the first conductive film 25 at the pressed position into contact with the second conductive film 35. When this operation is performed normally, that is, when the touch operation is performed in one cell C, the multi-touch panel 12 outputs the first output signal indicating one position in the cell C to the controller 100. In response to the first output signal, the controller 100 calculates the X and Y coordinates indicating the touch position and outputs the control signal So indicating the X and Y coordinate values to the control device of the machine. The control device of the machine outputs a command signal to perform a desired operation corresponding to the input X and Y coordinates. In this way, the desired operation related to the first operation key 11B or the second operation key 14 is performed.

On the other hand, when the touch operation is performed in two or more different cells C, the multi-touch panel 12 outputs, to the controller 100, the second output signal separately indicating the plurality of portions in the different cells C. Even when the second output signal is received, the controller 100 does not output the control signal So indicating the X and Y coordinate values of the touch positions to the control device of the machine. Therefore, an operation related to the first operation key 11B or the second operation key 14 is not performed.

As described above, the controller 100 outputs the control signal So according to predetermined rules that "the control signal So indicating the coordinates of one position is output when the first output signal indicating the one position in one cell C is input, and the control signal So indicating the coordinates of the plurality of positions is not output when the second output signal separately indicating the plurality of positions in at least two different cells is input." Such a controller 100 can be configured with, for example, a microcomputer which executes a predetermined program. Further, the controller 100 may be incorporated in the multi-touch panel 12 or may be provided separately from the multi-touch panel 12.

As explained in detail above, the control panel 1 of the first embodiment includes the resistive film type multi-touch panel 12 which outputs the first output signal indicating one position in one cell C when the touch operation is performed at a single position in the one cell or the touch operation is simultaneously performed at a plurality of positions in the one cell, and outputs the second output signal separately indicating the plurality of positions in at least two different cells C when the touch operation is simultaneously performed in at least two different cells C; and the controller 100 which outputs the control signal So indicating the coordinates of one position when receiving the first output signal, and does not output the control signal So indicating the coordinates of the plurality of positions even when receiving the second output signal. Since the multi-touch panel 12 is the resistive film type, the touch operation needs to be performed at a predetermined pressure so that an involuntary input can be prevented. In addition, while the multi-touch panel 12 can recognize a multi-point input, the controller 100 disables the multi-point input. In other words, the control panel 1 is characterized by including the multi-touch panel 12 capable of recognizing the multi-touch to disable the multi-touch. Therefore, it is possible to further enhance safety of the control panel 1 of the machine.

Figure 5:
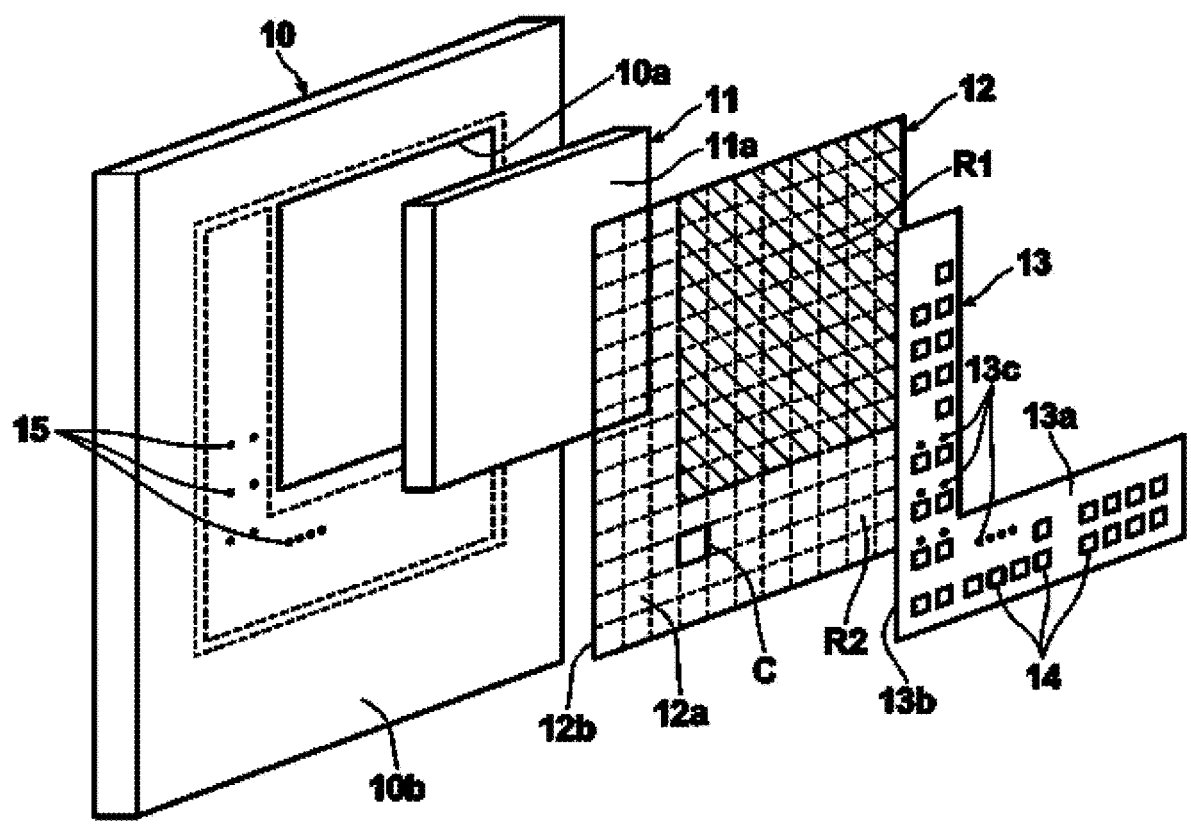
FIG. 5 is an exploded perspective view showing a control panel of a machine according to a second embodiment of the disclosure in an exploded state.

Next, a second embodiment of the disclosure will be described with reference to FIG. 5. FIG. 5 is an exploded view of a control panel 2 according to the second embodiment of the disclosure. This control panel 2 is different from the control panel 1 of the first embodiment shown in FIG. 2 in that the order of stacking the multi-touch panel 12 and the key sheet 13 is reversed. That is, in this control panel 2, the key sheet 13 is disposed in contact with the touch surface 12a which receives the touch operation of the multi-touch panel 12. Additionally, the key sheet 13 is formed of a sufficiently thin and soft material so that the touch operation is transmitted to the multi-touch panel 12 through the key sheet 13. Components which are substantially the same as those in the first embodiment are designated by the same reference numerals, and a detailed description thereof will be omitted.

In the control panel 2, in a preferable embodiment, a concavo-convex processing such as embossing or the like is applied to the front surface 13a which is a surface opposite to the rear surface 13b of the key sheet 13, and the rear surface 13b of key sheet 13 is in contact with the multi-touch panel 12. Particularly, in a preferable embodiment, a concavo-convex processing is performed in a range in which the second operation keys 14 are printed.

In the second embodiment, the second region R2 of the multi-touch panel 12 overlapped by the key sheet 13 is not particularly required to be light-transmittable.

The control panel 2 of the second embodiment basically has the same operation and effect as the control panel 1 of the first embodiment. Further, in the case in which the key sheet 13 is subjected to the concavo-convex processing as described above, the operator can further acquire a sense that the multi-touch panel 12 is touched.

What is claimed is:

1. A control panel of a machine, comprising:
   a controller;
   a multi-touch panel in resistive film type, comprising:
   a touch surface, receiving a touch operation;
   a first panel, comprising:
   a first electrode substrate,
   a plurality of first divided electrodes, being connected to the first electrode substrate and disposed parallel to each other in an X direction,
   a second electrode substrate, being disposed to face the first electrode substrate with a predetermined gap therebetween,
   a plurality of second divided electrodes, being connected to the second electrode substrate and disposed in parallel with each other in the X direction, and
   a first conductive film having a plurality of first strip-shaped conductive films respectively disposed in parallel between the first divided electrodes and the second divided electrodes facing each other; and
   a second panel, comprising:
   a third electrode substrate,
   a plurality of third divided electrodes, being connected to the third electrode substrate and disposed in parallel with each other in a Y direction orthogonal to the X direction,
   a fourth electrode substrate, being disposed to face the third electrode substrate with a predetermined gap therebetween,
   a plurality of fourth divided electrodes, being connected to the fourth electrode substrate and disposed in parallel with each other in the Y direction, and
   a second conductive film having a plurality of second strip-shaped conductive films respectively disposed in parallel between the third divided electrodes and the fourth divided electrodes facing each other, wherein the touch surface is divided into a plurality of cells by the plurality of first strip-shaped conductive films and the plurality of second strip-shaped conductive films, and
   wherein the multi-touch panel outputs a first output signal indicating coordinates of a single position in one cell when the touch operation is performed at the single position in the one cell or outputs the first output signal indicating coordinates of a midpoint of a plurality of positions in the one cell when the touch operation is simultaneously performed at the plurality of positions in the one cell,
   wherein the first output signal indicating the coordinates of the single position in the one cell or the first output signal indicating the coordinates of the midpoint of the plurality of positions in the one cell is received by the controller, and
   the multi-touch panel outputs a second output signal indicating coordinates of each single position in each of at least two different cells when touch operations are simultaneously performed in the each single position in the each of the at least two different cells or outputs the second output signal indicating coordinates of each midpoint of a plurality of positions in each of at least two different cells when touch operations are simultaneously performed at the plurality of positions in each of the at least two different cells, wherein the second output signal indicating the coordinates of the each single position in the each of the at least two different cells or the second output signal indicating the coordinates of the each midpoint of the plurality of points in the each of the at least two cells is received by the controller; and an image display panel having a display surface, wherein the display surface is divided into the plurality of cells defined by the first strip-shaped conductive film and the second strip-shaped conductive film, and wherein the controller outputs a control signal when receiving the first output signal indicating the coordinates of the single position in the one cell and the coordinates of the midpoint of the plurality of positions in the one cell, wherein the controller does not output a control signal when receiving the second output signal indicating the coordinates of the each single position of the plurality of positions in the each of the at least two different cells separately or the coordinates of the midpoint of the plurality of positions in the each of the at least two different cells separately.

2. The control panel of the machine according to claim 1, wherein the image display pane displays a first operation key formed on a basis of an image signal on the display surface, and wherein the control panel of the machine further comprises a key sheet, and wherein the multi-touch panel further comprises:
a first region with light-transmissivity, being in contact with at least a part of the display surface, and
a second region, being located at an area deviated from an area facing the display surface, and the key sheet has a front surface in which a second operation key is formed, and the key sheet is disposed in a state of being overlapped by the second region of the multi-touch panel.

3. The control panel of the machine according to claim 2, wherein
the key sheet is disposed in contact with a surface of the multi-touch panel opposite to the touch surface, and
the second region of the multi-touch panel is light-transmittable.

4. The control panel of the machine according to claim 2, wherein the key sheet is disposed in contact with the touch surface of the multi-touch panel.

* * * * *